United States Patent [19]

Marcos et al.

[11] Patent Number: 4,891,801
[45] Date of Patent: Jan. 2, 1990

[54] TERMINAL FOR THE TRANSMISSION OF DATA OVER A BIDIRECTIONAL ANALOG CHANNEL WITH ECHO CANCELLATION CONTROLLED BY THE RECEPTION RATE

[75] Inventors: Sylvie L. Marcos, Antony; Odile M. M. Macchi, Orsay; Jean-Bernard L. P. Pintaux, Lesigny, all of France

[73] Assignee: S.A.T. (Societe Anonyme de Telecommunications), Paris, France

[21] Appl. No.: 139,751

[22] Filed: Dec. 30, 1987

[30] Foreign Application Priority Data

Dec. 30, 1986 [FR] France ................... 86 18334

[51] Int. Cl.[4] .............................................. H04B 3/23
[52] U.S. Cl. ....................................... 370/32.1; 379/410
[58] Field of Search .................. 364/723, 724; 370/32, 370/32.1; 379/410, 411, 406

[56] References Cited

U.S. PATENT DOCUMENTS

| | | | |
|---|---|---|---|
| 4,074,086 | 2/1978 | Falconer et al. | |
| 4,370,741 | 1/1983 | Haass | 370/32 X |
| 4,527,020 | 7/1985 | Ito | 364/723 X |
| 4,531,220 | 7/1985 | Brie et al. | |
| 4,539,675 | 9/1985 | Fisher | 370/32 |

FOREIGN PATENT DOCUMENTS 0074089 9/1982 European Pat. Off. .
0107246 10/1983 European Pat. Off. .

OTHER PUBLICATIONS

Hespelt et al, "Ein verbesserter Echoloscher fur die Duplex-Datenubertragung uber 2-Draht-Verbindungen", Mar., 1983.
Peuch, "Sematrans 4848 un modem fonctionnant en duplex sur deux fils A 4800 bit/s", Communication et Transmission, Jun., 1984, France.
Falconer et al., "Echo Cancellation Techniques for Full-Duplex Data Transmission on Two Wire Lines", Nov. 1976, National Telephone Conference, Dallas, Tex., pp. 8.3-1 to 8.3-7.

Primary Examiner—Jin F. Ng
Assistant Examiner—Randall S. Vaas
Attorney, Agent, or Firm—Lowe, Price, Leblanc, Becker & Shur

[57] ABSTRACT

A terminal is provided for transmitting data over a bidirectional analog channel with echo cncellation coupled to the reception timing, wherein, between an emission circuit and a reception circuit coupled to a bidirectional line by a hybrid coupler, an echo canceller synthesizes an estimated echo from samples of an analog emitted signal, sampled at the same frequency as the received signal, the sampling frequency being controlled by the reception circuit, which is not synchronous with the emission circuit. Such a terminal requires no interpolation filter at the input of the reception circuit and makes possible optimum coupling of the echo canceller with an equalizer.

14 Claims, 8 Drawing Sheets

FIG. 9
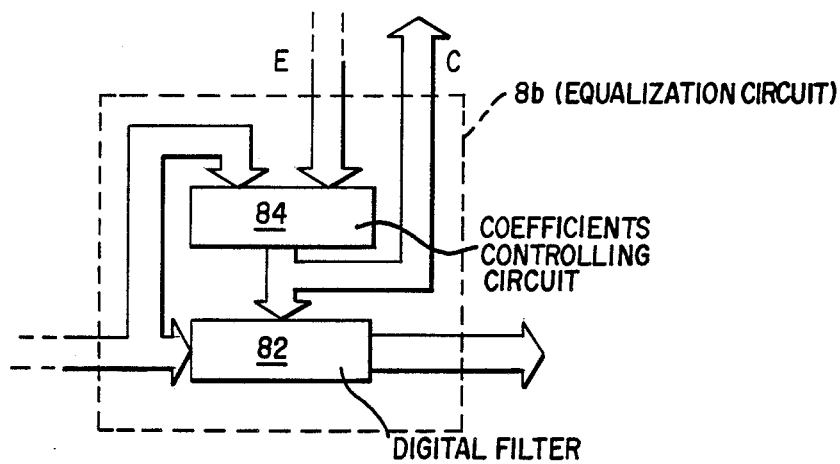
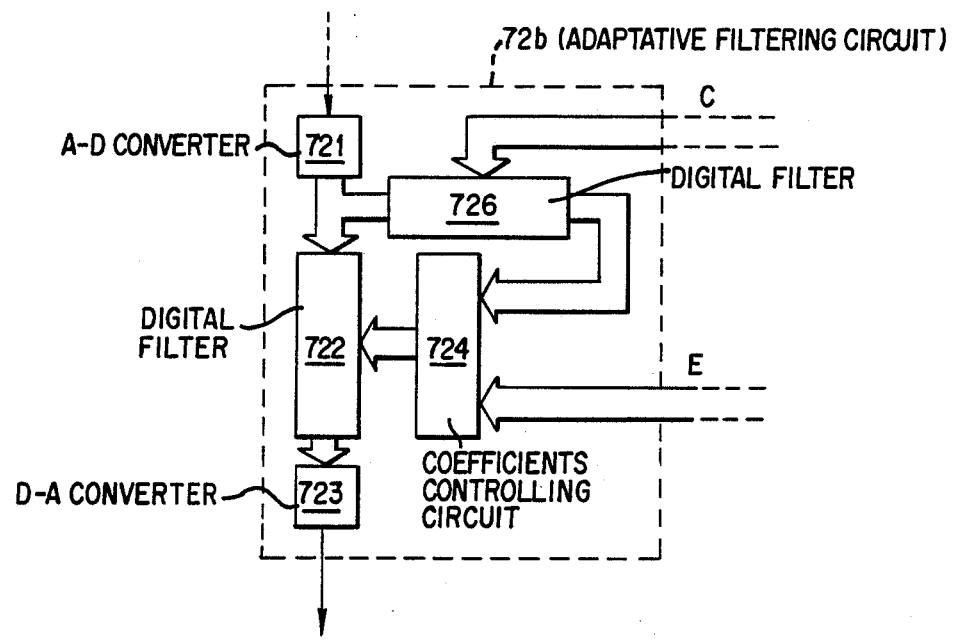
FIG. 10

TERMINAL FOR THE TRANSMISSION OF DATA OVER A BIDIRECTIONAL ANALOG CHANNEL WITH ECHO CANCELLATION CONTROLLED BY THE RECEPTION RATE

BACKGROUND OF THE INVENTION

1. Field of the Invention

The present invention relates to a terminal for transmitting data over a bidirectional analog channel, simultaneously in both directions, including:

a hybrid coupler connected to the bidirectional channel and to two unidirectional analog channels, one for emitting and the other for receiving, means, connected to the emitting channel, for generating at least one analog signal from local data to be emitted towards another terminal, means, connected to the receiving channel, for estimating, from a analog received signal, distant digital data coming from the other terminal, coded by means of symbols, at a modulation rate expressed in bauds, non synchronous with said means for generating said emitted signal, and at least one echo canceller disposed between said means for generating said emitted signal, and said means for estimating the distant data, adapted so as to estimate the echo signal and to subtract an estimated echo signal from said received signal.

With terminals of this type, a bidirectional channel, for example a simple twin wire connection, may be used for the transmission ("full duplex") of data between two terminals, simultaneously in both directions. In fact, because of the echo canceller, the main drawback of this type of connection, namely the presence in the receiving channel of an echo signal resulting from the parasite reflections of the locally emitted signal, and capable of disturbing the reception, is eliminated.

2. Description of the Prior Art

Terminals of the above defined type are already known, in particular from the article by S. B. Weinstein "A Passband Data-Driven Echo Canceller for Full-Duplex Transmission on Two-Wire Circuits", IEEE Trans. on Com. Vol. Com-25 N°7, July 1977, pages 654–665.

In a terminal of this type, the data to be emitted is digital data coded by means of symbols having a certain modulation rate, expressed in bauds, further called emission baud frequency. The echo canceller has at least one digital filter which calculates the estimated echo signal directly from the symbols to be emitted. Adjustment of the coefficient of the digital filter is made, for example, during an initialisation procedure, during which, with the distant terminal not emitting the nearby terminal emits a signal. It is then certain that the signal received is equal to the echo signal and the coefficients of the filter of the canceller are then adjusted so as to cancel out the difference between the true echo signal and the estimated echo signal. When the causes of the echo are not likely to vary in time, the terminal may then operate normally. When the causes of the echo are likely to change during time, the terminal is caused to operate by permanently adapting the coefficients of the filter of the canceller so that the correlation function between, on the one hand, the difference between the signal received and the estimated echo signal and, on the other hand, the signal at the input of the canceller, is zero. In fact, the preceding difference represents the sum of the signal from the distant terminal and an echo residue, and the correlation function between the signal from the distant terminal and the signal at the input of the canceller is zero. Thus, the echo residue can be cancelled out adaptively even in the presence of a signal from the distant terminal.

Because the echo canceller operates from the signals to be emitted, it is synchronized on the emission baud frequency. Since this later is not synchronous with the reception baud frequency, that is to say the modulation rate of the symbols transmitted by the distant terminal, the signal received is sampled at a sampling frequency chosen equal to a multiple of the emission baud frequency. Thus, the frequency for sampling the received signal and the work rate of the echo canceller are synchronized, which makes it possible for this latter to function without the information contained in the signal received being lost. For, naturally, the frequency which is a multiple of the emission baud frequency which serves for sampling the received signal is chosen fairly large so that Shannon's theorem is always respected, considering the expected spectral characteristics of the received signal, and in particular of the echo signal.

However, since the means for estimating the distant data are digital means working on samples, these samples must be obtained by sampling at a frequency which is a multiple of the reception baud frequency, or at a frequency equal to this baud frequency, which means that the samples of the difference between the received signal and the estimated echo signal must be passed through an analog interpolation filter, so as to reform an analog signal which may be sampled at the multiple frequency of the reception baud frequency, or at this baud frequency, before reception processing. Naturally, in order to reduce the number of operations to be carried out for echo cancellation, it is preferably to choose the sampling frequency, a multiple of the emission baud frequency, so that it is the lowest frequency possible. However, the lower frequency, the greater the constraints concerning the steepness of the slopes of the interpolation filter, and a compromise must in general be found.

Furthermore, in a digital construction of such a terminal, using for example processors, processing in the echo canceller and processing in the distant data estimation means, that is to say in the receiver, each required relatively high computing powers. Since these two processing operations are carried out at non synchronized timing, it is necessary to control the sharing of the processing time between the echo canceller and the receiver, which complicates the terminal.

Finally, in a terminal of the above type, if the signal propagating over the bidirectional channel undergoes appreciable and possibly variable distortion in time, it is possible, as is known, to compensate such distortion by means of a filter, called "equalizing filter" acting on the received signal, possibly adaptive so as to follow the variations in time of the characteristics of the bidirectional transmission channel. As is known, such a filter is for example a digital filter, whose coefficients are adjusted so as to compensate for the distortions of the transmission channel. Adjustment of the coefficients is made, for example, during an initialization procedure during which the distant terminal emits a predetermined sequence of signals known by the nearby terminal. This letter is adapted for comparing the sequence of estimated distant symbols with a predetermined sequence and for adjusting the coefficients of the equalizing filter so as to provide equality between these two sequences. When the characteristics of the transmission channel are not likely to change during time, the terminal can thus function normally. When the characteristics of the transmission channel are likely to change in time, the terminal is operated by permanently adapting the coefficients of the equalizing filter, using as criterion the fact that, since the coding signals can only take on a certain number of distinct and known states, the difference between the value of the signal received after equalization and echo cancellation and the value of the closest known state must be zero if the equalizing filter suitably compensates for the distortions in the transmission channel.

However, in a terminal of the above type, and in the cases where the echo canceller, like the equalizer, are adaptive, because their operating rates are different, their adaptations are controlled by different signals. It follows, that, in the frequent case where the equalizer is disposed downstream of the point where the echo canceller subtracts the estimated echo, the signal which controls the echo canceller includes noise due to the signal coming from the distant terminal, whereas the input of the equalizer includes noise due to the echo residue. The result is unsatisfactory performances of the whole of the terminal.

SUMMARY OF THE INVENTION

The present invention overcomes the above drawbacks by providing a terminal which has no interpolation filter, does not required control of time sharing between the computing units, and makes it possible to use an echo canceller whose adaptation is controlled by the signal which controls the adaptation of the equalizing filter, which confers very good performances thereon.

For this, the present invention provides a terminal of the above defined type, in which:

Said means for estimating the distant data include first means for sampling said received signal, means for processing the samples of said received signal, which are adapted for restoring estimated distant symbols and a timing signal whose frequency is equal to said modulation rate, and a means, synchronized by said timing signal, for controlling the sampling frequency of said first sampling means, and said echo canceller includes second sampling means for sampling said emitted signal, connected to said control means and controlled at the same frequency as said first sampling means, first filetring means for filtering the samples of said emitted signal and delivering samples of the estimated echo signal, and first subtraction means disposed after said first sampling means for subtracting said samples of the estimated echo signal from said samples of said received signal.

In the terminal of the invention, because the echo canceller operates at the timing defined by the clock signal synchronized with the reception baud frequency, it is pointless to place an interpolation filter downstream of the point where the samples of the estimated echo signals are subtracted from the samples of the received signal. Because the echo canceller and the receiver operate at synchronized rates, it is easy to control the time sharing of the computing units. Since the means for generating the emitted signal do not require a high computing power, it is possible, in one practical embodiment, to design a fairly simple and compact emitter, the echo canceller being included in the receiver, since these two systems operate at synchronous rates.

In this invention, it is remarkable that the inventors, Miss Marcos and Mrs. Macchi of the Laboratoire des Signaux et Systèmes (L2S) and Mr. Pintaux, of the Société Anonyme de Télécommunications (SAT), had the idea, in order to achieve the preceding results, of combining the synchronization of the echo canceller by the received with the use, as signal at the input of a digital echo canceller, of an analog signal. In fact, this idea goes against the prior art, which on the contrary teaches, in the case of a digital echo canceller, going as far back as possible in the emission chain for connecting the input of the echo canceller, while working directly on emitted symbols. The invention, which uses an echo canceller synthesizing a shorter echo signal, makes it possible to shorten the length of the filter used.

Because no assumption is made concerning the emitted signal, the terminal of the invention may operate with any type of emitted signal, particularly whatever its baud frequency and its carrier frequency, and therefore whether the spectral coverage between the emitting channel and receiving channel is total or partial, the emission and reception baud frequencies being in a rational ratio or not.

In the preferred embodiment of the device of the invention, said means for controlling the sampling frequency are adapted so that this frequency is a multiple of said modulation rate.

Advantageously, the symbols for coding the distant digital data may take on n distinct states of known values, said processing means include an automatic gain control circuit, followed by an A-D converter delivering digital samples, a comparison and decision circuit for comparing the values of said digital samples with n known values corresponding to the n distinct states, and for deciding on the value to assign to each estimated distant symbol, and a circuit for restoring, from said digital samples, said timing signal and a signal controlling the timing of the comparison and decision circuit.

According to a first characteristic of the invention, the first filtering means are adaptive, having an input, an output and a control input connected to the output of the first subtraction means and adapted for cancelling out the correlation function between the two signals applied respectively to their input and to their control input.

According to a second characteristic of the invention, second subtraction means are further provided between the output and the input of said comparison and decision circuit, for delivering an error signal, between said first sampling means and said first subtraction means second adaptive filtering means are provided having an input, an output and a control input receiving the error signal, and adapted for cancelling out the correlation function between the two signals applied respectively to their input and to the control input, and the first filtering means are adaptive, having an input, an output and a control input receiving the error signal, and adapted for cancelling out the correlation function between the two signals applied respectively to their input and to their control input.

According to a third characteristic of the invention, second subtraction means are further provided between the output and the input of the comparison and decision circuit, for delivering an error signal, between said subtraction means and the comparison and decision circuit second adaptive filtering means are provided having an input, an output and a control input receiving the error signal, and adapted for cancelling out the correlation function between the two signals applied respectively to their input and to their control input, and the first filtering means are adaptive, with an input, an output and a control input receiving the error signal, and adapted for cancelling out the correlation function between the error signal and the signal applied to their input, after permanent filtering of this input signal identical to the filtering between the input and the output of the second filtering means.

In such a terminal, the fact of using the same error signal for controlling adaptation of the filter of the echo canceller and adaptation of the equalizing filter leads to better performances in the presence of noise, for the signal controlling the echo canceller is freed of the distant signal. This makes it possible, with respect to the same structure in which the signals controlling the two adaptations are different, to use an echo canceller adapted for following faster time variations of the echo signal, without the risk of malfunction.

BRIEF DESCRIPTION OF THE DRAWINGS

Other features and advantages of the invention will be clear from the following description of the preferred embodiment and a few variants of the terminal of the invention, with reference to the accompanying drawings in which:

FIG. 9 shows the equalization circuit of the terminal of FIG. 8, FIG. 10 shows the adaptive filtering circuit of the echo canceller of the terminal of FIG. 8.

MORE DETAILED DESCRIPTION OF THE INVENTION

Throughout the whole of the figures, the connections which transmit analog signals are shown by a single line, of the type used in a known manner for schematizing for example a two wire connection, whereas the connections which transmit digital signals are shown by a double line, of the type used in known manner for schematizing for example a digital connection bus.

Figure 1:
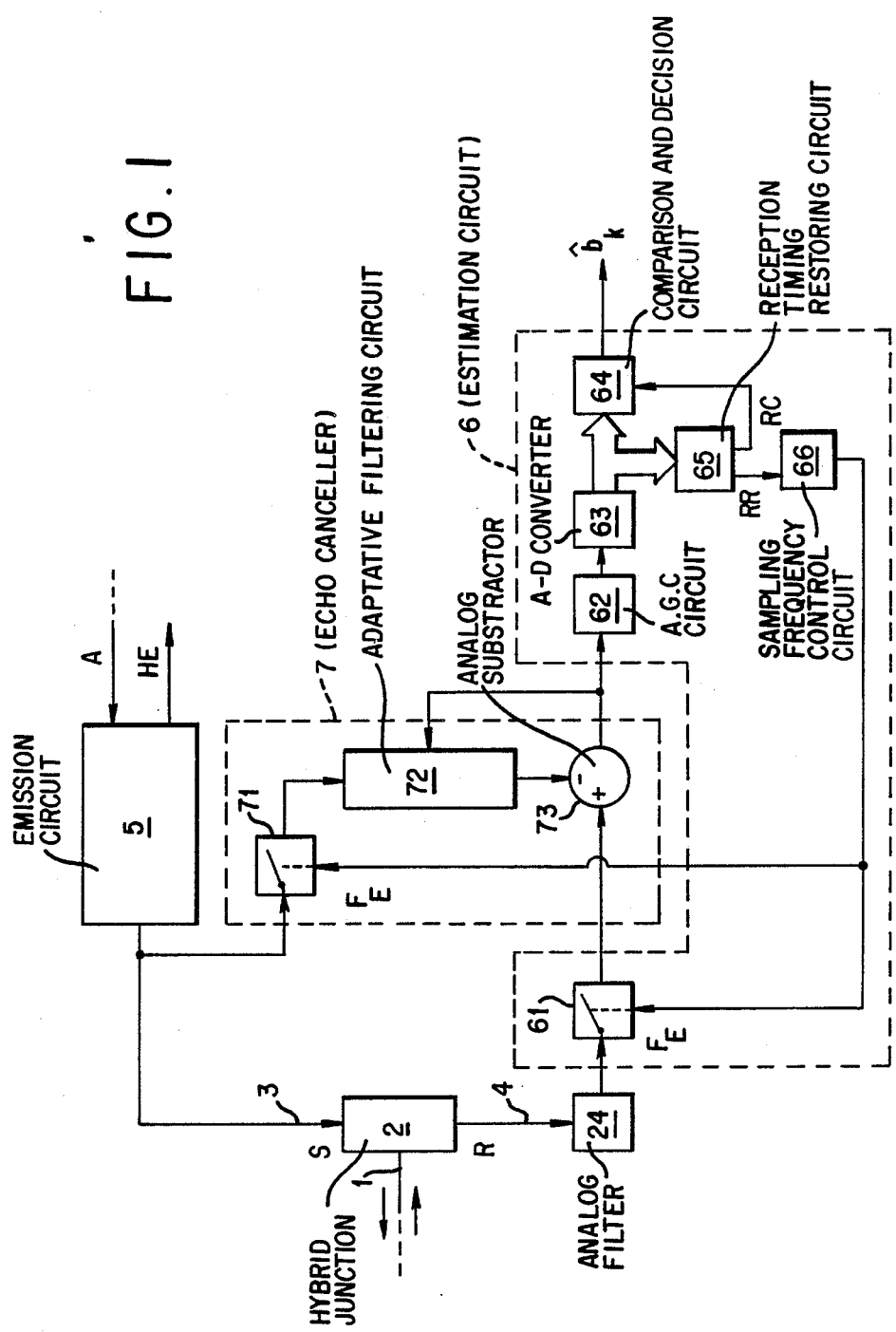
FIG. 1 is a block diagram of the terminal of the invention.

Referring to FIG. 1, a transmission terminal for transmitting digital data is connected to a bidirectional analog transmission channel of line 1, here with two wires, through a hybrid coupler or hybrid junction 2.

In a way known per se, the hybrid coupler 2 is provided with two accesses, one an input, the other an output, connected respectively to an emission channel 3 and to a reception channel 4. These two channels are also two-wire analog channels, but they are unidirectional in that the signals on the emission channels 3 enter the hybrid coupler 2 and leave through channel 1, whereas the signals on the reception channel 4 leave the hybrid coupler 2 where they entered through channel 1.

An emission circuit 5 is provided with an input receiving signal A, a main output delivering a signal S on the transmission channel 3 and an auxiliary output delivering a signal HE.

The reception channel 4 is connected to the input of a filter 24, whose output is connected to the input of a sampler 61. The output of sampler 61 is connected to the + input of an analog subtractor 73, whose output is connected, through an A.G.C. circuit 62, to an A-D converter 63. The output of the A-D converter 63 is connected to the inputs of two digital circuits 64 and 65. The digital circuit 65 delivers a reception timing signal RR to a circuit 66 and a timing control analog signal RC to the digital circuit 64. Circuit 66 controls the sampling frequency $F_3$ of the sampler 61.

The comparison and decision circuit 64 delivers a signal $b_k$.

The output of the emission circuit 5, delivering the signal S is connected to the input of a sampler 71 whose output is connected to the input of an adaptive filtering circuit 72. The output of the circuit 72 is connected to the − input of the subtractor 73. The sampler 71 is controlled, by the sampling frequency control circuit 66, at the same sampling frequency $F_3$ as the sampler 61. The adaptive filtering circuit 72 is provided with a control input connected to the output of subtractor 73.

Before beginning the more detailed description of each of the preceding circuits, let us see first of all the operation of the terminal which has just been described.

The emission circuit 5 receives the signal A, by way of example a binary data signal of 9600 bits/s, to be transmitted to another terminal not shown and connected to channel 1. The emission circuit 5, as will be more clearly explained hereafter, codes the binary signal by means of a symbol signal $a_k$ at 2400 bauds, then filters this signal so as to obtain an analog signal S, suitable to be emitted over line 1.

Simultaneously, the other terminal carries out the same type of operations, and from an analog signal R received over the reception channel 4, the circuit 6 of FIG. 1 estimates the distant data emitted by the other terminal and more particularly symbols $b_k$ while delivering the estimated symbol signal $b_k$. Circuit 6 of FIG. 1 combines the sampler 61, the A.G.C. circuit 62, the A-D converter 63, the comparison and decision circuit 64, circuit 65 restoring the reception timing and circuit 66 controlling the sampling frequency.

However, since the hybrid coupler 2 has imperfections, as well as line 1, an appreciable part of the received signal R comes from the reflections of the transmitted signal S, on these imperfections and the resultant echo signal, whose level may be very much greater than that of the signal coming from the distant terminal, must be eliminated for processing on reception. This is the role of the echo canceller 7, combining the sampler 71 and the adaptive filtering circuit 72. The adaptive filtering circuit 72 is, as is well known, adapted for cancelling out the correlation function between the signal applied to its input, here samples of the transmitted signal S, and the signal at the output of subtractor 73. Thus, the echo canceller 7 permanently synthesizes the samples, synchronous with the samples of the received signal R, so that the signals at the output of subtractor 73 are not correlated with the samples of the emitted signal S, so are only representative of the signal coming from the distant terminal.

Here, circuit 65 for restoring the reception timing is adapted for delivering to the sampling frequency control circuit 66 the reception timing signal RR whose frequency is equal to the modulation rate, or baud frequency $F_B$ of the symbols $b_k$ coming from the distant terminal, that is to say the reception baud frequency. Circuit 66 is a timing generating circuit which then controls the sampling frequency $F_E$ of the samplers 71 and 61 so that it is a multiple of the reception baud frequency $F_B$.

In the frequent case where, without being synchronized, the transmission and reception baud frequencies are of the same order of size, the sampling frequency $F_E$ may be chosen equal to three times the reception baud frequency $F_B$, namely in the case of a reception baud frequency of 2400 bauds:

$$F_E = 7200 \text{ Hz}.$$

Thus, because the echo canceller 7 operates at a timing imposed by the reception timing restoring circuit 65, it is not necessary as in the prior art terminals to place an interpolation filter at the output of subtractor 73.

Figure 2:
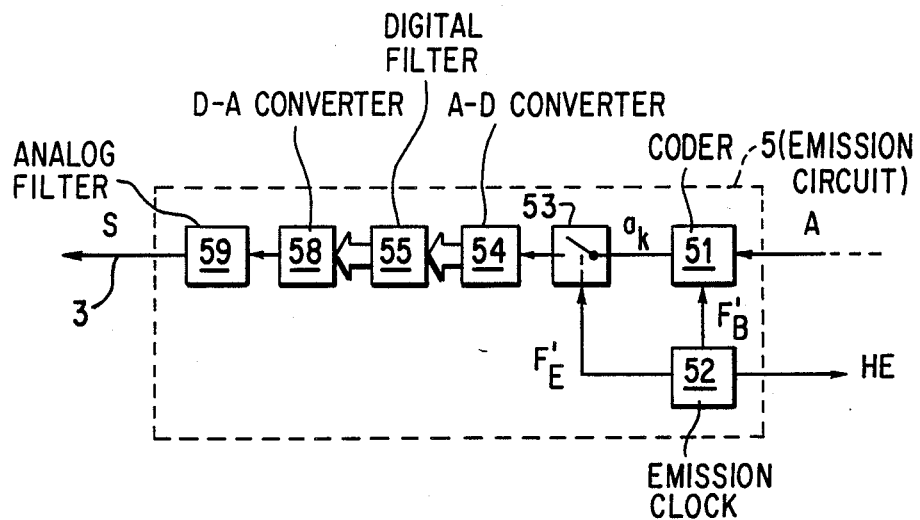
FIG. 2 shows the emission circuit of the terminal of FIG. 1.

FIG. 2 shows the emission circuit 5, which includes a coder 51 of known type delivering, in response to a binary signal of given flow rate, a succession of symbols $a_k$, of a modulation rate or baud frequency less than the flow rate. Here, the flow rate of the binary signal if 9600 bits/s and the baud frequency $F'_B$ is equal to 2400 bauds, each signal in this case being able to take on 16 distinct states of predetermined and known values. The baud frequency $F'_B$ is fixed by a emission clock 52 which delivers here a signal HE to a circuit of known type and not shown, disposed upstream of the transmission circuit 5, and a sampling frequency control signal $F'_E$ of a sampler 53, at a value such that:

$$F'_E = 3 F'_B$$

After passing through an A-D converter 54 and a digital filter 55 of known type for shaping the signals, the resultant signal is applied to a D-A converter 58 followed by a filter 59, so as to obtain the analog signal S fed to the emission channel 3.

Filter 24 is an analog filter of known type for limiting the reception band, so the noise, to what is just necessary for receiving the signal coming from the distant terminal.

The digital circuit 65 is of known type and adapted for restoring, from the digital samples of the signal from the distant terminal, the timing signal RR whose frequency, as has already ben mentioned, is identical to the baud frequency $F_B$ of the symbols coming from the distant terminal. Circuit 65 is also adapted for delivering a signal RC controlling the timing of the comparison and decision circuit 64.

The comparison and decision circuit 64 is of known type which compares the values of the digital samples at its input with, here, 16 values corresponding to the 16 possible states for the symbol and decides on assigning a value to each estimated distant symbol $b_k$.

Figure 3:
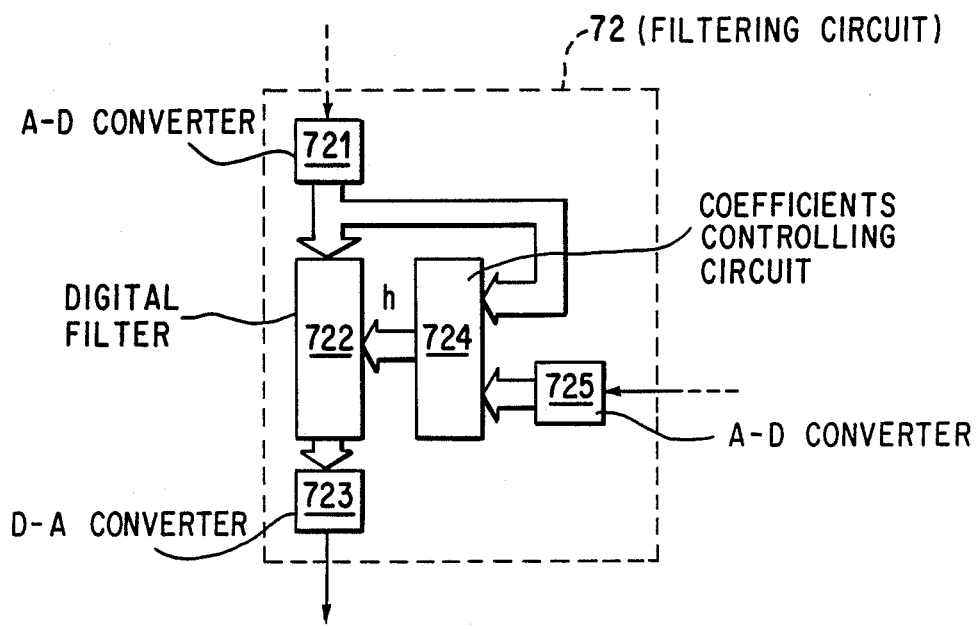
FIG. 3 shows the adaptive filtering circuit of the echo canceller of the terminal of FIG. 1.

Referring to FIG. 3, the adaptive filtering circuit 72 includes, at the input, an A-D converter 721, whose output is connected to the input of a digital filter 722 and to a first input of a digital circuit 724 controlling the coefficients of filter 722. The output of the digital filter 722 is connected to the output of the filtering circuit 72 through a D-A converter 723. The control input of the filtering circuit 72 is connected to a second input of the control circuit 724 through an A-D converter 725. The control circuit 724 is adapted for controlling the coefficients of the digital filter 722 so as to cancel out the correlation function between the signal applied to the input of the digital filter 722 and the signal applied to the control input of the filtering circuit 72. A conventional and well known method consists in using the algorithm of the stochastic gradient, which modifies the coefficients of the filter proportionally to this correlation function, which algorithm may be summed up by the following equation, in the present case where the signal at the input of the filter is real:

$$h_i^{k+1} = h_i^k + \alpha e(k\,T) \times (k\,T\text{-}i\,T)$$

in which

T is the sampling period, $h_i^k$ is the coefficient of the filter of rank i, at the time $t_k = k\,T$, e (k T) is the signal applied to the control input at the time $t_k = k\,t$, x (k T-i T) is the signal applied to the input of the filter at time $t_{(k\text{-}i)}^l = k\,T\text{-}i\,T$, and $\alpha$ is a constant.

Figure 4:
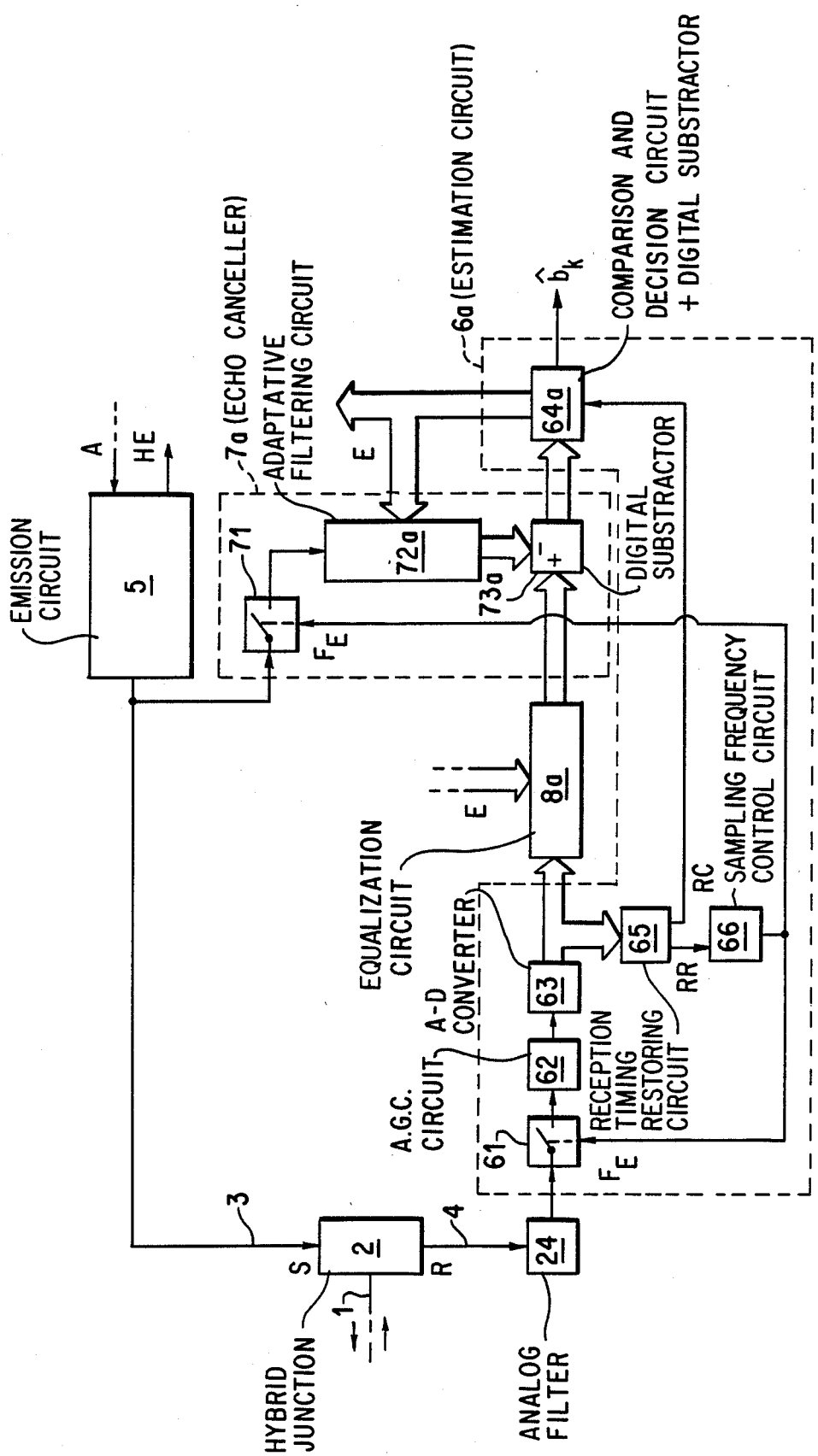
FIG. 4 shows a first variant of the terminal of FIG. 1, corresponding to the case where an equalization circuit is inserted upstream of the echo canceller.
Figure 5:
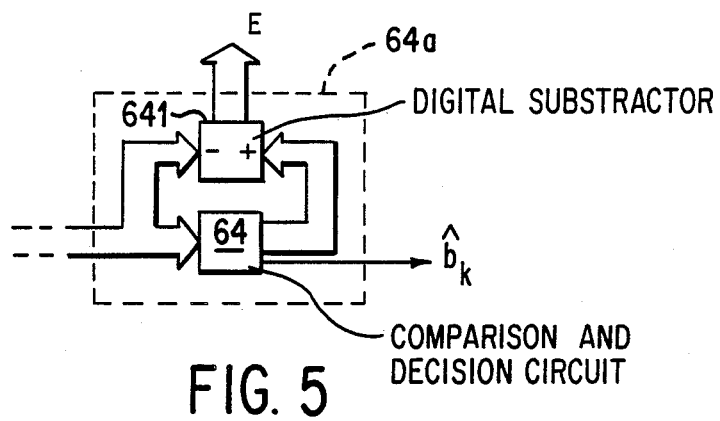
FIG. 5 shows in greater detail the reception circuit of the terminal of FIG. 4.

Referring now to FIG. 4, a variant of the terminal of the invention will be described, in which an equalization circuit 8a is inserted before the echo canceller, which here bears the reference 7a. As shown in this figure, the A.G.C. circuit 62 is then disposed immediately after the sampler 61, and it is followed by the A-D converter 63. The whole of the processing which follows is carried out on digital samples. The output of the A-D converter 63 is, as before, applied to the input of the reception timing restoring circuit 65 which delivers the signal RC to the comparison and decision circuit 64, forming part of block 64a, as shown in FIG. 5. The reception timing restoral circuit 65 also delivers a signal RR to the sampling frequency control circuit 66, which controls the samplers 61 and 71 at the frequency $F_E$. The output from the A-D converter 63 is also applied to the input of the equalization circuit 8a whose output is connected to the +input of a digital subtraction circuit 73a, whose output is connected to the input of the comparison and decision circuit 64, as shown in FIGS. 4 and 5. The −input of the digital subtraction circuit 73a is connected to the output of an adaptive filtering circuit 72a whose input is connected to the output of sampler 71, disposed as before.

Referring to FIG. 5 a digital subtraction circuit 641 is connected between the output and the input of the comparison and decision circuit 64 and delivers an error signal E equal to the difference between the known values assigned to the estimated signals $b_k$ and the received values, before decision, of these symbols.

Figure 6:
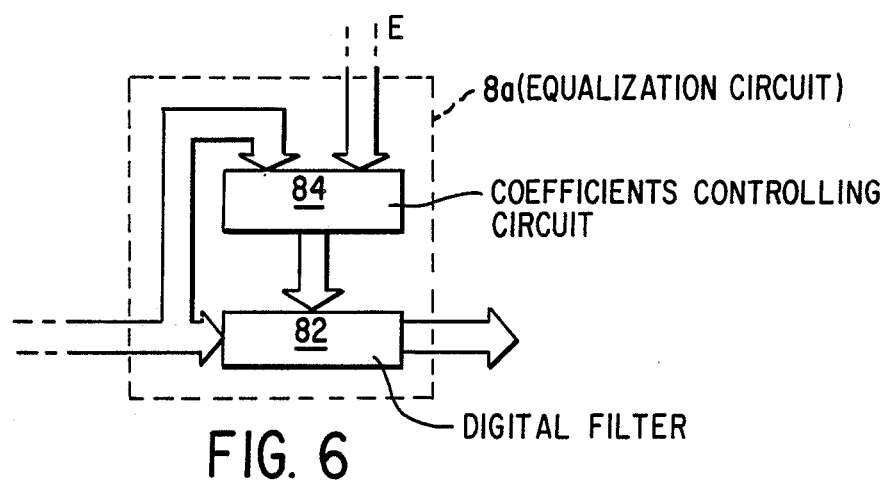
FIG. 6 shows the equalization circuit of the terminal of FIG. 4.

The equalization circuit 8a is an adaptive filter provided, as is known, for compensating for the variable distortions undergone by the signal coming from the distant terminal. It has a control input receiving the error signal E. As shown in FIG. 6, it includes a digital filter 82 whose coefficients are permanently controlled by a control circuit 84 which receives the signal at the input of the filter 82 and the error signal E. The control circuit 84 is here of a type similar to that of the control circuit 724, and is adapted for controlling the coefficients of the digital filter 82 so as to cancel out the correlation function between the signal applied to the input of the digital filter 82 and the error signal R. Circuit 84 uses the algorithm of the stochastic gradient.

Figure 7:
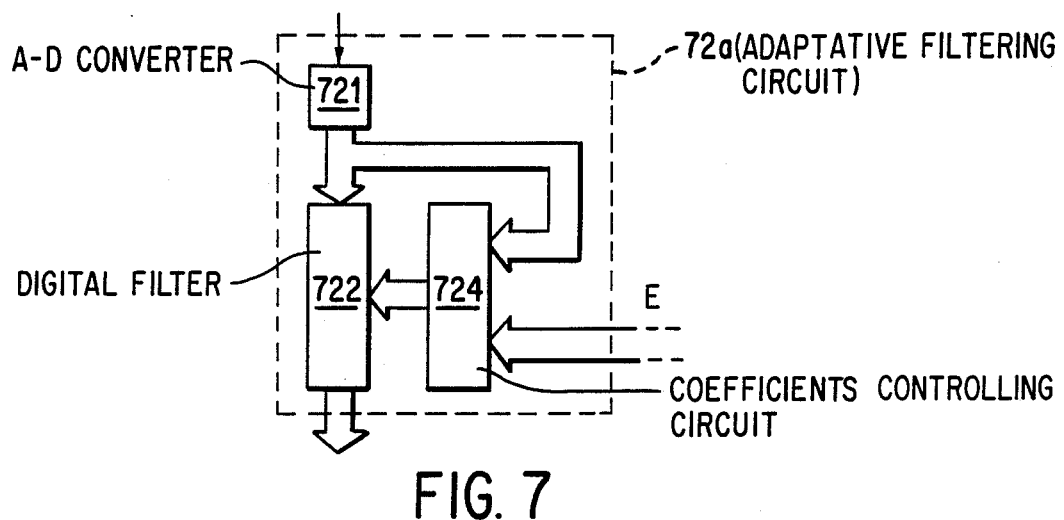
FIG. 7 shows the adaptive filtering circuit of the echo canceller of the terminal of FIG. 4.

The adaptive filtering circuit 72a is shown in FIG. 7. It is identical to the adaptive filtering circuit 72 of FIG. 3, except that it includes neither A-D converter 725 nor D-A converter 723.

The operation of the structure shown in FIG. 4 is obvious, if it is mentioned that, when the coefficients of the equalization circuit 8a and of the echo canceller 7a are suitably adjusted, the error signal E is theoretically zero. The error signal E therefore controls the adaptation of the coefficients of the digital equalizing filter 82 and of the digital echo canceller filter 722 for it to be so.

The structure of FIG. 4 has however a drawback, related to the fact that the echo canceller 7a must take into consideration the lengthening of the echo signal in the equalization circuit 8a.

Figure 8:
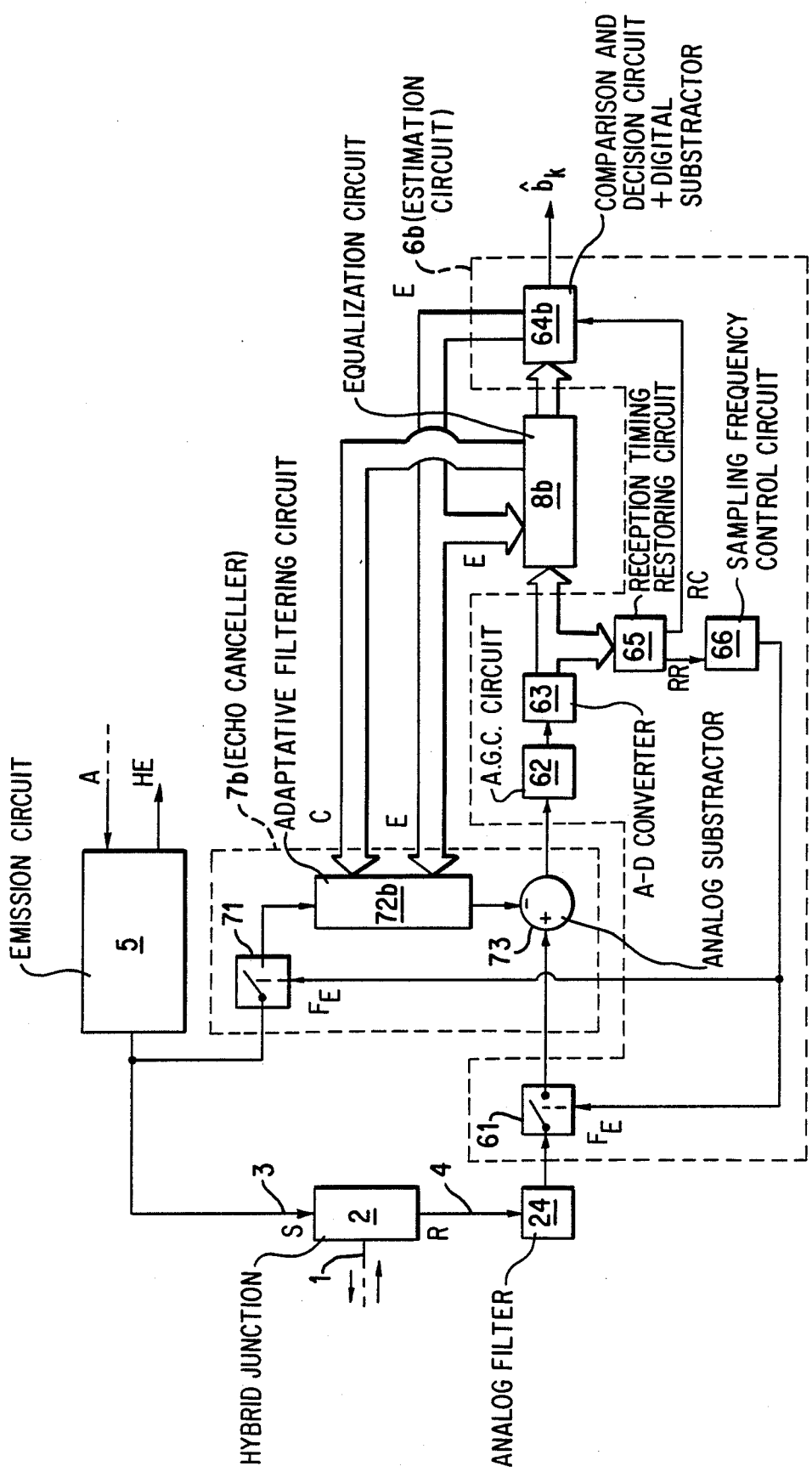
FIG. 8 shows a second variant of the terminal of FIG. 1, corresponding to the case where an equalization circuit is inserted downstream of the echo canceller.

The structure shown in FIG. 8 does not have this drawback, for the equalization circuit is there placed downstream of the echo canceller.

The structure of FIG. 8 is obtained from the structure of FIG. 1 by inserting, after the A-D converter 63, an equalization circuit 8b. The output of the equalization circuit 8b is connected to the input of the equalization and decision circuit 64, block 64b of FIG. 8 being identical to block 64a shown in FIG. 5. The error signal E is applied to the control input of the equalization circuit 8b and to the control input of the echo canceller 7b. In this case, it is necessary to take into account, in the echo canceller 7b, the fact that the error signal E is not taken directly from the output of the echo canceller, but after passing through the equalization circuit 8b.

This is achieved as shown in FIGS. 9 and 10. In FIG. 9, the structure of the equalization circuit 8b is used again. It is identical to that of the equalization circuit 8a, but an auxiliary output has been provided delivering the digital signal C controlling the coefficients of the digital filter 82.

FIG. 10 shows the adaptive filtering circuit 72b used in the echo canceller 7b. It is identical to the adaptive filtering circuit 72 of FIG. 3, except that it does not have the A-D converter 725 but that on the other hand it does have a filter 726, for causing the input signal of the digital filter 722, before application to the control circuit 724, to permanently undergo auxiliary filtering identical to that of the digital equalization filter 82. For this, the digital filter 726 is identical to filter 82 and its coefficients are controlled by the digital signal C.

Figure 11:
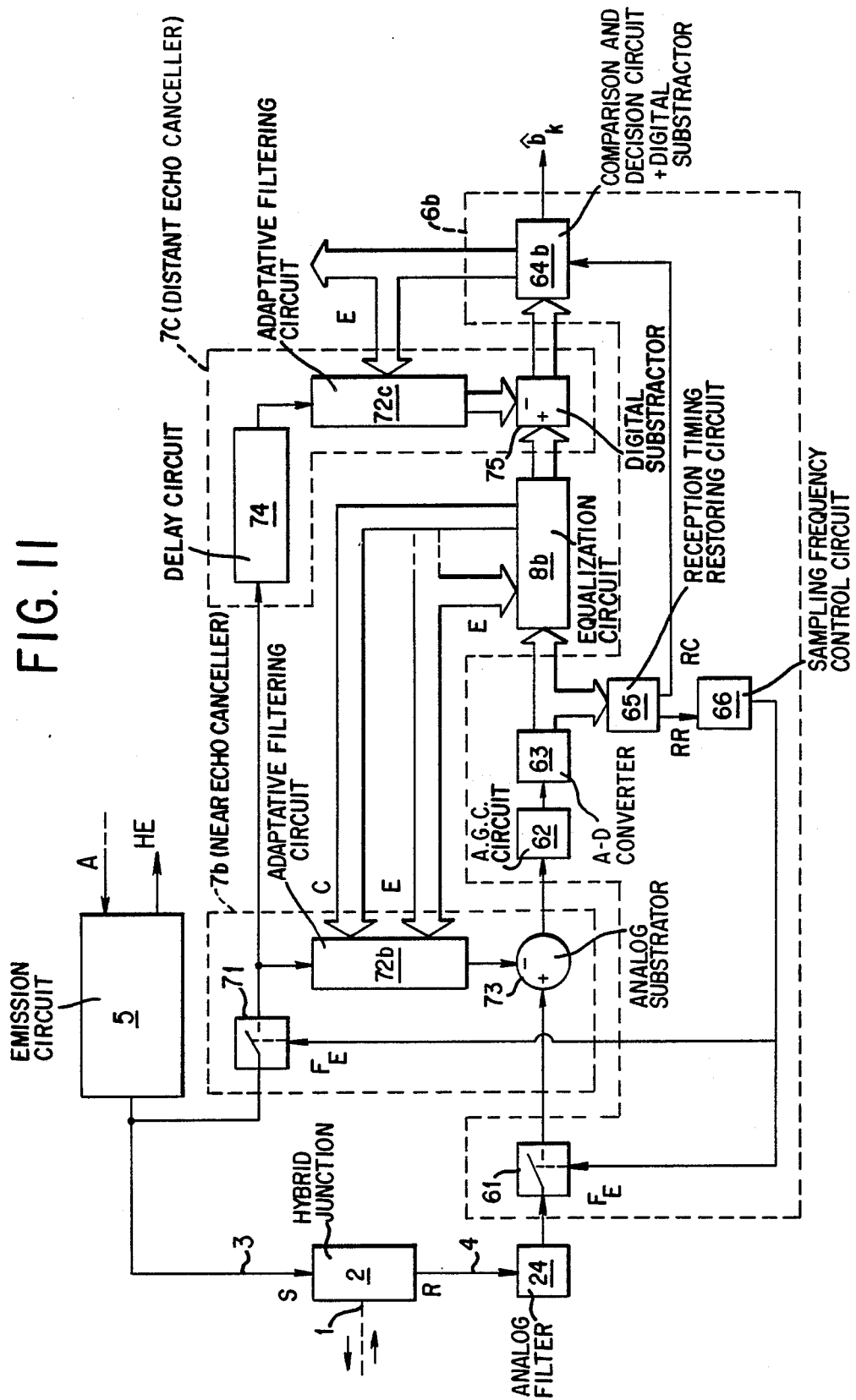
FIG. 11 shows a variant of the terminal of FIG. 8, corresponding to the case where an additional echo canceller, for the distant echo, is inserted downstream of the equalization circuit.

FIG. 11 shows a variant of the structure of FIG. 8, including an additional echo canceller 7c, for cancelling out a distant echo without time interference with the echo canceller out by the echo canceller 7b. The echo canceller 7c is inserted downstream of the equalization circuit 8b and it includes a delay circuit 74, here an analog circuit, to witch the samples outputted by the sampler 71 are applied, followed by an adaptive filtering circuit 72c, identical to circuit 72a of FIG. 7, controlled by the error signal E and a digital subtraction circuit 75 for subtracting the samples from the estimated distant echo signal. The delay circuit 74 delays the samples of the transmitted signal so that they arrive at the input of the filtering circuit 72c substantially at the same time as the samples of the distant echo signal arrive at the input of the digital subtraction circuit 75.

Figure 12:
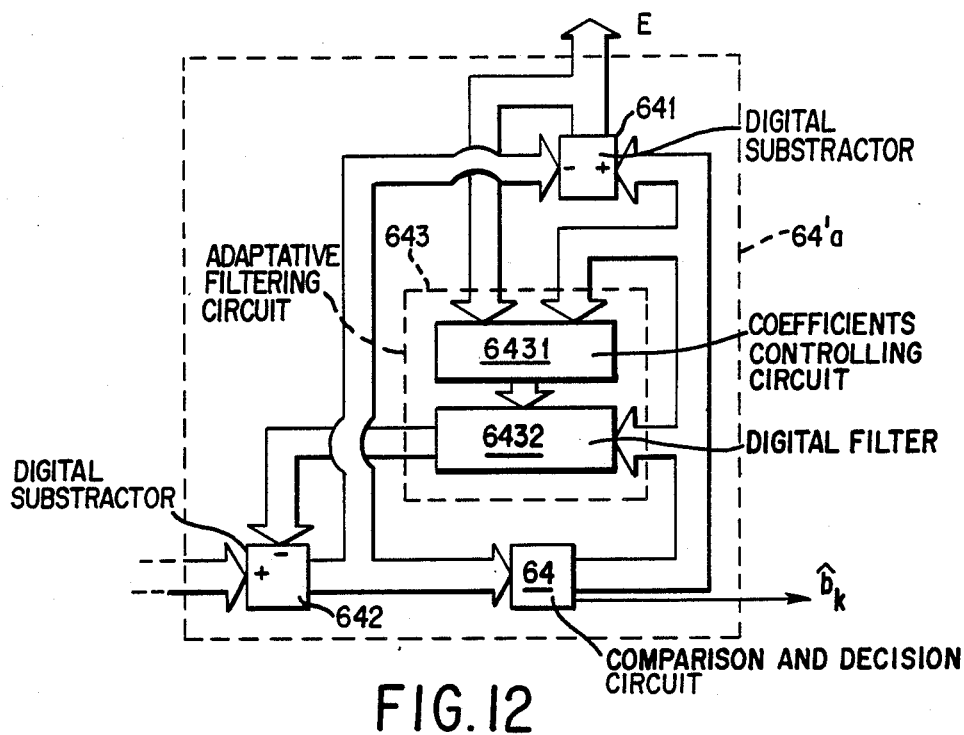
FIG. 12 shows a variant of the reception circuit of the terminal of FIGS. 4, 8 and 11.

Referring now to FIG. 12, a variant 64a of circuit 64a of FIG. 5 will be described, which corresponds to the case where a recursive equalization complement is added. In FIG. 12, a digital subtraction circuit 642 subtracts, from the signal at the input of circuit 64a, the output signal of an adaptative filtering circuit 643, which filters the output signal of the comparison and decision circuit 64 so as to cancel out the correlation function between the error signal E and the output signal of the comparison and decision circuit 64. In a way known per se, the filtering circuit 643 includes a digital filter 6432, controlled by control circuit 6431 adapted for applying the algorithm of the gradient.

In the above description, it has been assumed, for the sake of simplification, that the transmitted signal, like the received signal, was a base band signal. Naturally, it is within the scope of a man skilled in the art to adapt the terminal of the invention so that it operates with a pass band, by adding on the emission side the necessary modulator and, on the reception side, the demodulator which may possibly be required. Similarly, it is within the scope of a man skilled in the art to use the terminal of the invention in the case where, with the signals modulating in-quadrature carriers, these latter are processed in complex form.

Figure 13:
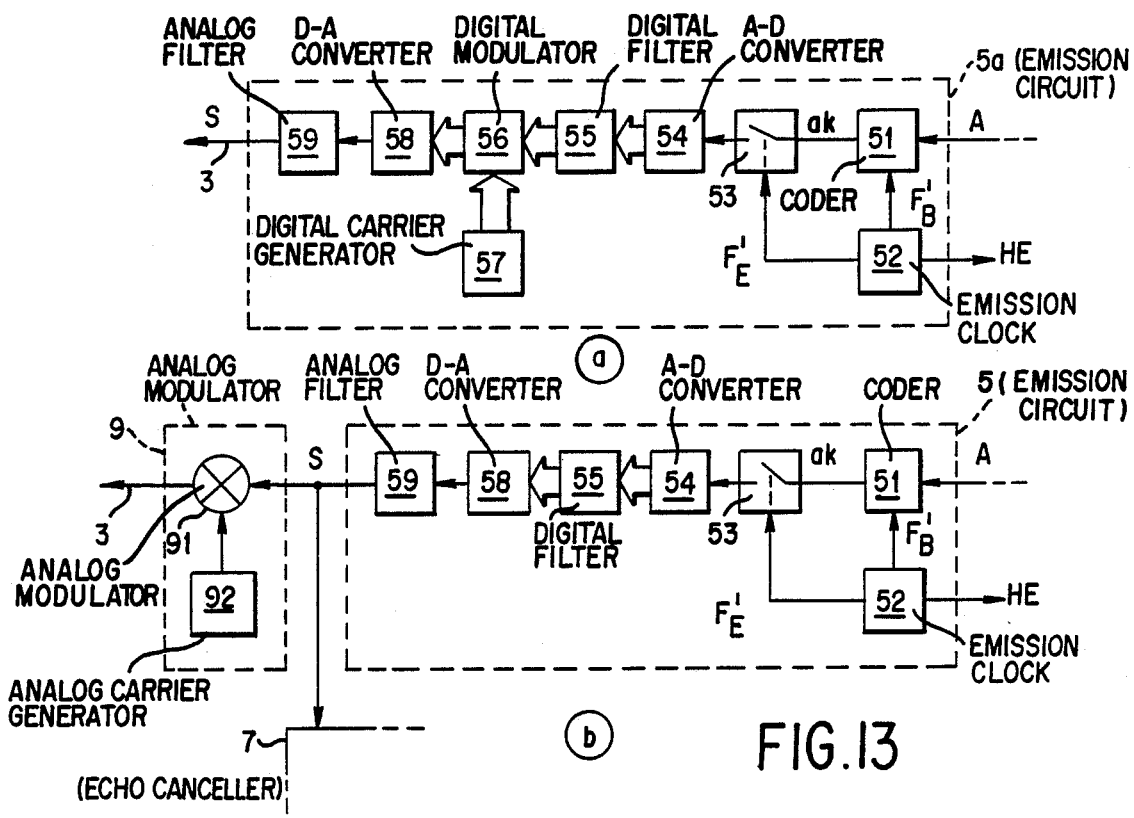
FIG. 13 shows two variants of the emission circuit of the terminal of FIGS. 1, 4, 8 and 11.

FIG. 13a shows, for example, a variant 5a of the emission circuit 5 including, between the filter 55 and the D-A converter 58 a digital modulator 56 for modulating a carrier generated by a digital carrier generator 57. The FIG. 13b shows the case where the emission circuit 5 is kept as it is, the modulation being performed in an analog modulator 9 here including an analog multiplier 91 and an analog carrier generator 92. In such a case, the input signal for the echo canceller may continue to be taken immediately upstream of the hybrid coupler 2 or, on the contrary, and as shown in FIG. 13b, between the transmission circuit 5 and the modulation circuit 9, by of course inserting modulation in the echo canceller.

What is claimed is:

1. A terminal for transmitting data over a bidirectional analog channel, simultaneously in both directions, including:
   a hybrid coupler connected to the bidirectional channel and to two unidirectional analog channels, one for emitting and the other for receiving,
   means, connected to the emitting channel, for generating at least one analog emitted signal from local data to be emitted towards another terminal,
   means, connected to the receiving channel, for estimating, from a analog received signal, distant digital data coming from the other terminal, coded by means of symbols, at a modulation rate expressed in bauds, non synchronous with said means for generating said analog emitted signal, and
   at least one echo canceller having an input, and disposed between said means for generating said analog emitted signal, and said means for estimating the distant data, adapted so as to estimate an echo signal resulting from parasite reflections of said analog emitted signal and to subtract an estimated echo signal from said analog received signal, said means for estimating the distant data include first means for sampling said analog received signal, means for processing the samples of said analog received signal, which are adapted for restoring estimated distant symbols and a timing signal whose frequency is equal to said modulation rate, and means, synchronized by said timing signal, for controlling the sampling frequency of said first sampling means, and said echo canceller includes second sampling means for sampling said analog emitted signal, connected to said control means and controlled at the same frequency as said first sampling means, first filtering means for filtering the samples of said analog emitted signal and delivering samples of the estimated echo signal, and first subtraction means for subtracting said samples of the estimated echo signal from said samples of said analog received signal.

2. The terminal as claimed in claim 1, wherein said means for controlling the sampling frequency are adapted so that said sampling frequency is a multiple of said modulation rate.

3. The terminal as claimed in claim 1, wherein said first filtering means is adaptive, having a first input, an output and a control input connected to the output of the first subtraction means and adapted for cancelling out the correlation function between the two signals applied respectively to said first input of said first filtering means and to said control input of said first filtering means.

4. The terminal as claimed in claim 3, wherein said first filtering means include:

an A-D converter followed by a digital filter, and means for adaptively controlling the coefficients of the digital filter in response to the signal at the first input of the digital filter and to the signal applied to the control input.

5. The terminal as claimed in claim 1, wherein said means for generating said analog emitted signal are connected directly to the input of the echo canceller and to an emission channel of the hybrid coupler.

6. The terminal as claimed in claim 1, wherein, with said analog emitted signal being in base band, the means for generating said emitted signal are connected directly to the input of the echo canceller and through an analog modulator to the emission channel of the hybrid coupler.

7. A terminal for transmitting data over a bidirectional analog channel, simultaneously in both directions, including:

a hybrid coupler connected to the bidirectional channel and to two unidirectional analog channels, one for emitting and the other for receiving, means, connected to the emitting channel, for generating at least one analog emitted signal from local data to be emitted towards another terminal, means, connected to the receiving channels, for estimating, from a analog received signal, distant digital data coming from the other terminal, coded by means of symbols, at a modulation rate expressed in bauds, non synchronous with said means for generating said analog emitted signal, and at least one echo canceller disposed between said means for generating said analog emitted signal, and said means for estimating the distant data, adapted so as to estimate an echo signal resulting from parasite reflections of said analog emitted signal and to subtract an estimated echo signal from said analog received signal, said means for estimating the distant data include first means for sampling said analog received signal, means for processing the samples of said analog received signal, which are adapted for restoring estimated distant symbols and a timing signal whose frequency is equal to said modulation rate, and means, synchronized by said timing signal, for controlling the sampling frequency of said first sampling means, said echo canceller includes second sampling means for sampling said analog emitted signal, connected to said control means and controlled at the same frequency as said first sampling means, first filtering means for filtering the samples of said analog emitted signal and delivering samples of the estimated echo signal, and first subtraction means for subtracting said samples of the estimated echo signal from said samples of said analog received signal, and wherein, with the symbols for coding the distant digital data able to take on n distinct states of known values, said processing means include an automatic gain control circuit, followed by an A-D converter delivering digital samples, a comparison and decision circuit having an input and an output for comparing the values of said digital samples with n known values corresponding to the n distinct states, and for deciding on the value to assign to each estimated distant symbol, and a circuit for restoring, from said digital samples, said timing signal and a signal controlling the timing of the comparison and decision circuit.

8. The terminal as claimed in claim 7 wherein, said means for controlling the sampling frequency are adapted so that said sampling frequency is a multiple of said modulation rate.

9. The terminal as claimed in claim 7, wherein:

second subtraction means are further provided between the output and the input of said comparison and decision circuit, for delivering an error signal, between said first sampling means and said first subtraction means second adaptive filtering means are provided having a first input, an output and a control input receiving the error signal, and adapted for canceling out the correlation function between the two signals applied respectively to said first and control, inputs of said second adaptive filtering means and between the signals applied respectively to said first filtering means first input and said control input.

10. The terminal as claimed in claim 7, wherein second subtraction means are further provided between the output and the input of the comparison and decision circuit, for delivering an error signal, between said first subtraction means and the comparison and decision circuit second adaptive filtering means are provided having a first input, an output and a control input receiving the error signal, and adapted for cancelling out the correlation function between the two signals applied respectively to said first and control inputs of said second adaptive filtering means, and the error signal and the signal applied to said first input of said first filtering means, after permanent filtering of said input signal identical to the filtering between the first input of said first filtering means and the output of the second filtering means.

11. The terminal as claimed in claim 10, wherein said second filtering means include a first digital filter and means for adaptively controlling the coefficients of this first digital filter in response to the signal at the first input thereof and to the error signal and, said first filtering means include a second digital filter having an input and means for adaptively controlling the coefficients of this second digital filter in response to the error signal and to the output signal of a third digital filter including a first input connected to the input of the second digital filter and having coefficients permanently controlled so as to be identical to those of said first digital filter of said second filtering means.

12. The terminal as claimed in claim 10, wherein an echo canceller is further provided for the distant echo, including at the output of said second sampling means, a delay circuit followed by third filtering means for filtering the samples of the emitted and delayed signal and for delivering samples of the estimated distant echo signal, and third subtraction means, disposed after said second filtering means for subtracting the samples of the estimated distant echo signal from the samples at the output of said second filtering means.

13. The terminal as claimed in claim 12, wherein the third filtering means are adaptive, having a first input, an output and a control input receiving the error signals and adapted for cancelling out the correlation function between the two signals applied respectively to said first input of said third filtering means and to said control input of said third filtering means.

14. The terminal as claimed in claim 9, wherein fourth subtraction means are further provided disposed at the input of the comparison and decision circuit and connected to the output of fourth filtering means having an output for delivering to the comparison and decision circuit digital samples from which have been subtracted the samples at the output of said fourth filtering means, these latter being adaptive with a first input connected to the output of the comparison and decision circuit and a control input receiving the error signal, and adapted for cancelling out the correlation function between the two signals applied respectively to said first input of said fourth filtering means and to said control input of said fourth filtering means.

* * * * *